US005808629A

United States Patent [19]

Nally et al.

[11] Patent Number: 5,808,629

[45] Date of Patent: Sep. 15, 1998

[54] APPARATUS, SYSTEMS AND METHODS FOR CONTROLLING TEARING DURING THE DISPLAY OF DATA IN MULTIMEDIA DATA PROCESSING AND DISPLAY SYSTEMS

[75] Inventors: Robert Marshal Nally, Plano; Donald Richard Tillery, Jr., Frisco, both of Tex.

[73] Assignee: Cirrus Logic, Inc., Fremont, Calif.

[21] Appl. No.: 597,602

[22] Filed: Feb. 6, 1996

[51] Int. Cl.[6] .......... G06F 13/00

[52] U.S. Cl. .......... 345/508; 345/213; 395/873

[58] Field of Search .......... 395/508, 509, 395/511, 873; 345/201, 508, 509, 213, 511

[56] References Cited

U.S. PATENT DOCUMENTS

| | | | |
|---|---|---|---|
| 5,148,272 | 9/1992 | Acampora et al. | 358/133 |
| 5,212,742 | 5/1993 | Normile et al. | 382/56 |
| 5,274,453 | 12/1993 | Maeda | 358/183 |
| 5,327,173 | 7/1994 | Nishizawa et al. | 348/412 |
| 5,386,234 | 1/1995 | Velzman et al. | 348/409 |
| 5,432,900 | 7/1995 | Rhodes et al. | 395/154 |
| 5,451,981 | 9/1995 | Drako et al. | 345/118 |
| 5,517,612 | 5/1996 | Dwin et al. | 395/166 |
| 5,543,824 | 8/1996 | Priem et al. | 345/508 |
| 5,559,999 | 9/1996 | Maturi et al. | 395/550 |
| 5,587,726 | 12/1996 | Moffat | 345/508 |

FOREIGN PATENT DOCUMENTS

| | | | |
|---|---|---|---|
| 0 389 835 A2 | 10/1990 | European Pat. Off. | H04N 1/41 |
| 0 510 640 A2 | 10/1992 | European Pat. Off. | H04N 7/13 |
| 0 522 853 A3 | 1/1993 | European Pat. Off. | G11B 21/08 |
| 0 545 323 A1 | 6/1993 | European Pat. Off. | H04N 5/92 |
| 0 658 053 A1 | 6/1995 | European Pat. Off. | H04N 7/137 |
| 0 673 171 A2 | 9/1995 | European Pat. Off. | H04N 7/50 |
| 2083578 | 3/1990 | Japan | G09G 1/02 |
| 2083579 | 3/1990 | Japan | G09G 1/02 |

OTHER PUBLICATIONS

Proceedings SPIE—The international society for optical engineering, Steroscopic displays and virtual reality system II, "Double buffering technique for binocular imaging in a windows" J.S. McVeigh et al, v 2409, 7–9 Feb. 1995.

AT&T Technical Journal, vol. 72, No. 1, Jan 1993, Short Hills, NJ, United States.

J. Fandrianto et al., A programmable Solution for Standard Video Compression, COMPCON '92, San Francisco, CA, pp. 47–50, Feb. 24, 1992.

*Primary Examiner*—Kee M. Tung
*Attorney, Agent, or Firm*—James J. Murphy; Steven A. Shaw

[57] ABSTRACT

A method is disclosed for controlling tearing in a display control system which includes first and second buffers, with input of data to a selected one of the buffers controlled by an input pointer and output of data from a selected one of the buffers controlled by an output pointer. Data is first input into the first buffer and substantially simultaneously data is output from the first buffer. The output pointer is then toggled such that data is input into the first buffer and output from the second buffer. Next, the input pointer is toggled, such that it is input into the second buffer and data is output from the second buffer. The output pointer is again toggled such that data is output from the first buffer and input into the second buffer.

27 Claims, 8 Drawing Sheets

APPARATUS, SYSTEMS AND METHODS FOR CONTROLLING TEARING DURING THE DISPLAY OF DATA IN MULTIMEDIA DATA PROCESSING AND DISPLAY SYSTEMS

TECHNICAL FIELD OF THE INVENTION

The present invention relates in general to multimedia processing and display systems and in particular to apparatus, systems and methods for controlling tearing during the display of data in multimedia processing and display systems.

CROSS-REFERENCE TO RELATED APPLICATIONS

The following copending and coassigned United States patent applications contain related information and are incorporated herein by reference:

U.S. patent application Ser. No. 08/098,846 (Attorney's Docket No. P3510-P11US), entitled "System And Method For The Mixing Of Graphics And Video Signals," and filed Jul. 29, 1993 now abandoned;

U.S. patent application Ser. No. 08/223,845 (Attorney's Docket No. P3510-P21US), entitled "Apparatus, Systems And Methods For Processing Video Data In Conjunction With A Multi-Format Frame Buffer," and filed Apr. 6, 1994 now U.S. Pat. No. 5,506,604; and U.S. patent application Ser. No. 08/376,919 (Attorney's Docket No. P3510-P20US), entitled "Apparatus, Systems and Methods For Controlling Graphics and Video Data in Multimedia Data Processing And Display Systems," filed Jan. 23, 1995 now U.S. Pat. No. 5,598,525.

BACKGROUND OF THE INVENTION

As multimedia information processing systems increase in popularity, system designers must consider new techniques for controlling the processing and display of data simultaneously generated by multiple sources. In particular, there has been substantial demand for processing systems which have the capability of concurrently displaying both video and graphics data on a single display screen. The development of such systems presents a number of design challenges, not only because the format differences between graphics and video data must be accounted for, but also because of end user driven requirements that these systems allow for flexible manipulation of the data on the display screen.

One particular technique for simultaneously displaying video and graphics data on a single display screen involves the generation of "windows." In this case, a stream of data from a selected source is used to generate a display within a particular region or "window" of the display screen to the exclusion of any nonselected data streams defining a display or part of a display corresponding to the same region of the screen. The selected data stream generating the display window "overlays" or "occludes" the data from the nonselected data streams which lie "behind" the displayed data. In one instance, the overall content and appearance of the display screen is defined by graphics data and one or more "video windows" generated by data from a video source occlude a corresponding region(s) of that graphics data. In other instances, a video display or window may be occluded or overlaid by graphics data or even another video window.

One of the major difficulties in managing video in a combined video and graphics windowing environment results from the fact that the video data being received and displayed are constantly being updated, typically at a rate of thirty frames per second. In contrast, the graphics data are normally generated once to define the graphics display and then remain static until the system CPU changes that graphics display. Thus, the occlusion (overlay) of video data with graphics data requires that the static graphics data "in front of" the video data not be destroyed each time the video window is updated.

A second concern with windowing systems operating on both video and graphics data is the formatting differences between the video and graphics data themselves since video is typically digitized into a YUV color space while graphics is digitized into an RGB color space. Moreover, the video and graphics windows are usually of different spacial resolutions. Hence, any combination video and graphics windowing system must have the capability of efficiently handling data in both the YUV and RGB formats and in different resolutions.

In addition to these difficulties, the problem of controlling tearing in the video windows must also be addressed. Tearing results when video data is input into a display control system at a rate different than the rate at which the video data is output for display updated. This may occur, for example, when an independent asynchronous NTSC video source, such as a VCR or television cable, is being used to supply video data. Tearing specifically occurs when, data is input into the frame buffer at a rate different than data is output for display refresh. In presently available display control systems, because of the different rates of input and output, portions of input frames (n) and (n+1) are output in the same output frame (p), resulting in tearing.

Tearing most often manifests itself by the "jumping" or "splitting" of fast moving objects or images on the display screen. This is in contrast to the "smoothness" or "wholeness" of images or objects in motion which would occur if every displayed video frame was composed of only one input or captured frame of video data. Ultimately, tearing reduces the quality of the video windows in multimedia systems as compared with the video display of a conventional television or VCR.

Thus, the need has arisen for circuits, systems and methods for controlling tearing in multimedia systems. In particular, such circuits, systems and methods should be applicable to the control of tearing in windowing multimedia display systems.

SUMMARY OF THE INVENTION

In general, the principles of the present invention provide for the control of display tearing when data is input to the frame buffer at a rate which is lower, or even much lower, than the rate at which data is retrieved from the frame buffer for display refresh (update). In the preferred embodiment, multiple buffers within the frame buffer are employed. Switching between buffers is accomplished with an input vertical synchronization signal timing the input of each frame of video received and a control signal indicating that a line of data being output includes video data. The toggling scheme of the present invention insures that the only time both the input (capture) stream and the output stream (output) streams are rastered to and from the same buffer area, the output stream is ahead of the input stream. Since the faster stream is therefore always ahead of the slower stream, no overrun will occur.

According to a first embodiment of the principles of the present invention, a method is provided for controlling tearing in a display control system including first and second buffers, input of data to a selected one of the buffers controlled by an input pointer and output of data from a selected one of the buffers controlled by an output pointer. Data is first input into the first buffer while substantially simultaneously data is output from the first buffer. The output pointer is then toggled such that data is input into the first buffer and output from the second buffer. Next, the input pointer is toggled such that data is input into the second buffer and output from the second buffer. Finally, the output pointer is again toggled such that data is output from the first buffer and input into the second buffer.

According to a second embodiment of the present invention, a method is provided for controlling tearing in a display system including an input source and an output appliance, data received from the input source timed by an input timing signal and output of data to the output appliance timed by an output timing signal. During a first stage, data is output from a first area of the frame buffer and input into the first area of the frame buffer, the first stage starting with a first active cycle of the input timing signal and ending with a first active cycle of the output timing signal following the first active cycle of the input control signal. During the second stage, data is output from a second area of the frame buffer and data is input into the first area of the frame buffer, the second stage starting with the first active cycle of the output timing signal following the first active cycle of the input timing signal and ending with a second active cycle of the input timing signal. During a third stage, data is output from the second area of the frame buffer while data is input into the second area of the frame buffer, the third stage starting with the second active cycle of the input timing signal and ending with a second active cycle of the output timing signal following the second active cycle of the input timing signal. Finally, during a fourth stage, data is output from the first area of the frame buffer and data is input into the second area of the frame buffer, the fourth stage starting with the second active cycle of the output timing signal and ending with a third active cycle of the input timing signal.

According to an additional embodiment of the principles of the present invention, a display control system is disclosed which includes a frame buffer memory having first and second buffer areas for storing display data, output addressing circuitry for generating addresses for retrieving data from a selected one of the buffer areas, and input addressing circuitry for generating addresses for inputting data into a selected one of the buffer areas. The output addressing circuitry is operable during a first operating stage to address the first buffer, during a second operating stage to address the second buffer, during a third operating stage address the second buffer, and during a fourth operating stage to address again the first buffer. The input addressing circuitry is operable during the first stage and the second stages to address the first buffer, and during the third and fourth stages to address the second buffer.

The principles of the present invention are further embodied in tearing control means which includes first and second buffers. Means are also provided for generating input and output pointers for inputting data into the first buffer and substantially simultaneously outputting data from the first buffer. Means are also provided for toggling the output pointer for inputting data into the first buffer and outputting data from the second buffer. Additional means are included for toggling the input pointer for inputting data into the second buffer and outputting data from the second buffer. Finally, means are included for toggling the output pointer for outputting data from the first buffer and inputting data into the second buffer.

The principles of the present invention advantageously provide substantial improvements over the prior art. In particular, the present invention provides for the control of tearing in the display screen in a video/graphics display system. Advantageously, the "jumping" often manifested during the movement of images on the screen is eliminated or substantially reduced. Instead, according to the present invention, a smooth motion is generated on the screen in such instances.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE INVENTION

The principles of the present invention and their advantages are best understood by referring to the illustrated embodiment depicted in FIGS. 1–10 of the drawings, in which like numbers designate like parts.

Figure 1:
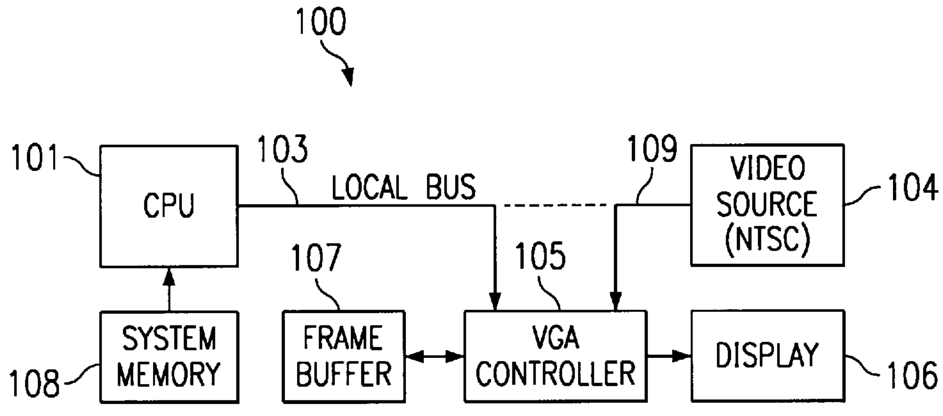
FIG. 1 is a top level functional block diagram of a multi-media processing and display system embodying the principles of the present invention.

FIG. 1 is a high level functional block diagram of a multi-media processing and display system 100 operable to process and simultaneously display on a single display screen both graphics and video data of different color and/or spacial resolutions, according to the principles of the present invention. Display system 100 includes a central processing unit (CPU) 101 which controls the overall operation of system 100 and generates graphics data defining graphics images to be displayed. CPU 101 communicates with the remainder of the system discussed below via a local bus 103. System 100 also includes a real-time video data source 104. A real time video stream may be presented to the system VGA controller 105 in one of two ways. First, video data source 104 may be coupled to local bus 103 and a video data stream introduced through dual aperture addresses. In this case, video source 104 will directly address the system frame buffer 107. Second, video source 104 may be coupled directly to VGA controller 105 via a dedicated bus 109 or "video port." In this instance, VGA controller 105 generates the required addresses into frame buffer 107. Real-time video source 104 may be, for example, a CD ROM unit, a laser disk unit, a videotape unit, television cable outlet or other video data source outputting video data in a YUV format. CPU 101 operates in conjunction with a system memory 108 which stores graphics and video data on a real-time basis. System memory 108 may be for example random access memory (RAM), floppy disk, hard disk or other type of storage device.

A VGA controller 105 embodying the principles of the present invention is also coupled to local bus 103. VGA controller 105 will be discussed in detail below; however, VGA controller 105 generally interfaces CPU 101 and video source 104 with a display unit 106 and a multi-format system frame buffer 107. Frame buffer memory 107 provides temporary storage of the graphics and video data during processing prior to display on display unit 106. According to the principles of the present invention, VGA controller is operable in selected modes to store graphics and video data together in frame buffer 107 in their native formats and resolutions. In a preferred embodiment, the frame buffer area is partitioned into on-screen memory and off-screen memory. Frame buffer 107 is also a "unified" memory in which video or graphics data can be stored in either the on-screen or off-screen areas. In the preferred embodiment, display unit 106 is a conventional raster scan display device and frame buffer 107 is constructed from dynamic random access memory devices (DRAMs).

Figure 2:
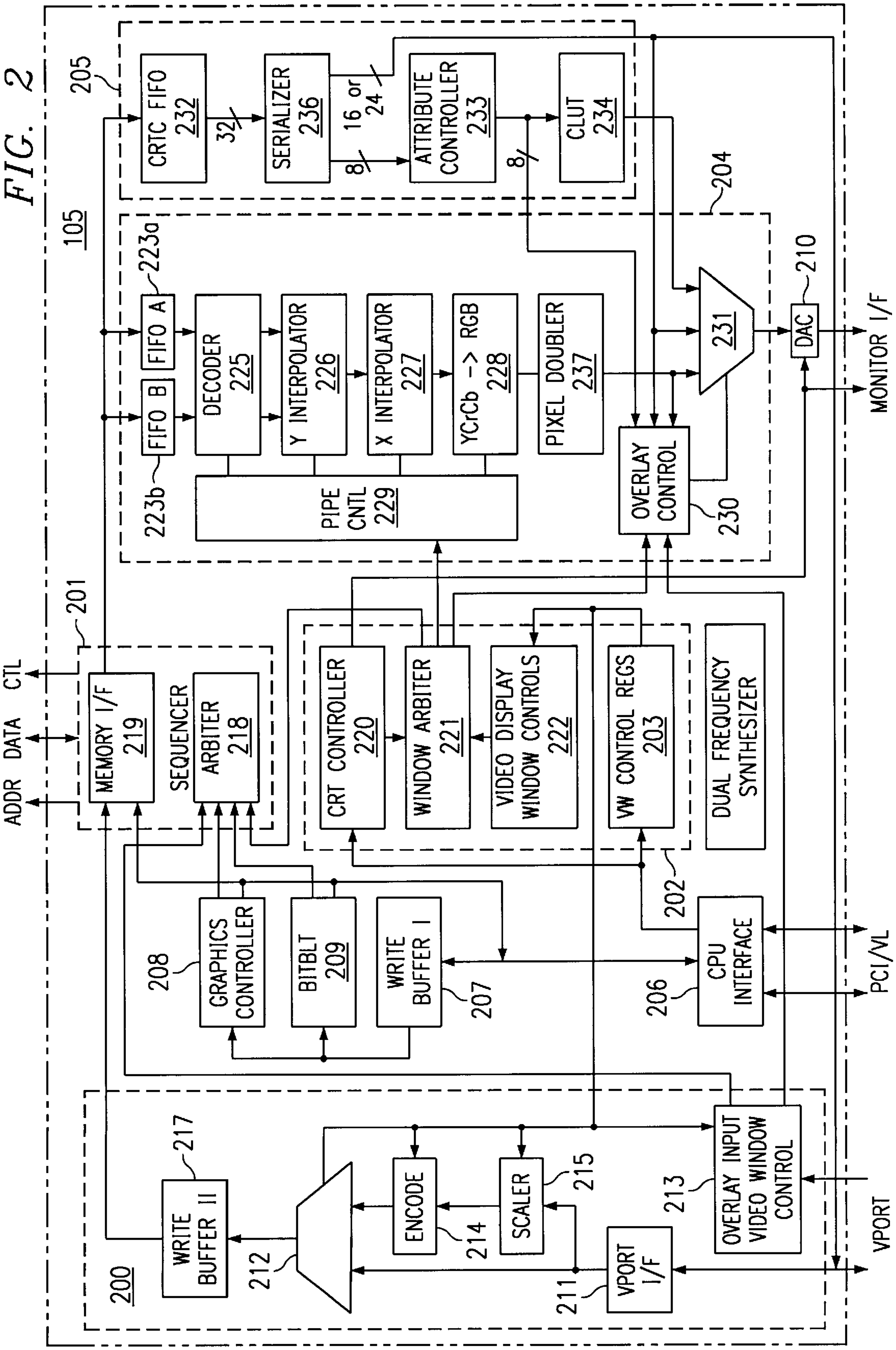
FIG. 2 is a more detailed functional block diagram of the VGA controller depicted in FIG. 1.

FIG. 2 is a more detailed functional block diagram of VGA controller 105. The primary circuitry blocks of VGA controller 105 include video front-end video pipeline 200, memory (frame buffer) control circuitry 201, CRT/window control circuitry 202, video window control registers 203, video back-end pipeline 204 and graphics back-end pipeline 205. VGA controller 105 further includes a CPU interface 206 for exchanging instructions and data via a PCI or VL bus, such as local bus 103 in system 100, with CPU 101. A write buffer 207 and conventional graphics controller 208 allow CPU 101 to directly control data within frame buffer 107 via memory control circuitry 201.

In the preferred embodiment of system 100, CPU 101 can write video data and/or read and write graphics data to frame buffer 107 via CPU interface 206. In particular, CPU 101 can direct each pixel to the frame buffer using one of two maps depending on whether that pixel is a video pixel or a graphics pixel. In the preferred embodiment, each word of pixel data ("pixel") is associated with one of two addresses, one which directs interpretation of the pixel as a video pixel through video front-end pipeline 200 and the other which directs interpretation of the pixel as a graphics pixel through write buffer 207 and graphics controller 208. As a consequence, either video or graphics pixel data can then be input to CPU interface 206 from the PCI/VI bus through a single "dual aperture" port as a function of the selected address.

Data which is input through the video port 211 address-free. In this case, video window controls 213 generates the required addresses to either the on-screen memory area or the off-screen memory as a function of display location for the video window. In the preferred embodiment, window controls 213 generate addresses using the same video control registers 203 used to control retrieval of the video in the back-end pipeline (i.e., the screen x and y position registers 500 and 501 discussed below in conjunction with FIG. 5). When data is being received through both the CPU interface 206 and the VPORT 211 simultaneously, the data is interleaved into memory with the two write buffers 207 and 217 buffering the data such that neither stream is interrupted or forced into a wait state at the source component (i.e, bus 103 or video source 104).

It should be noted at this point that frame buffer 107 includes at least two different data areas or spaces to which data can be directed by the given address (either CPU 103 or controls 213 generated). Each space can simultaneously store graphics or video data depending on the selected display configuration. The on-screen area corresponds to the display screen; each pixel rastered out of a given pixel location in the on-screen area defines a corresponding screen pixel. The off-screen area is used to store data defining a window for selectively overlaying or "occluding" the data over the on-screen memory, fonts and other data necessary by controller 105. Further, as will be discussed further below, both graphics and video data may be rastered from frame buffer 107 and passed through video backend pipeline 204 while only graphics data is ever passed through graphics backend pipeline 205. As discussed further below, each of these space may be further partitioned into multiple spaces (areas) for double buffering antitearing control.

Alternate ways of storing and retrieving graphics and video data from unified frame buffer 107. For example, CPU 103 may write a static graphics background into part of the on-screen memory with the remaining "window" in the on-screen memory area filled with playback video data. "Playback" video data can be either (1) live video data input from the VPORT; (2) YUV (video) data written through interface 206 by CPU 103; or (3) true color (5:5:5, 5:6:5, or 8:8:8) RGB graphics data (for example animation graphics data) written in through either the VPORT or interface 206. Similarly, a playback video background and a window of graphics data may be written into the on-screen area. In each of these cases, the data are rastered out as the display is without overlay; the video playback data is passed through the video backend pipeline 204 as a function of display position by controls 202 and the graphics data passed through the graphics backend pipeline 250.

Windows of data retrieved from the off-screen memory can be retrieved and used to occlude a portion of the data being rastered out of the on-screen memory. For example, a window of playback data can be stored in the off-screen memory and a frame of static graphics data (either true color data or indices to CLUT 234) stored in the on-screen memory. In this case, the static graphics are rastered out of the on-screen memory without interruption and passed through the graphics backend pipeline 205. The window of data in the off-screen memory is rastered out only when the display position for the window has been reached by the display raster and is passed through video backend pipeline 204. As discussed below, data from the video backend pipeline 204 can then be used to selectively occlude (overlay) the data being output from the graphics backend pipeline 205. A window of static graphics data (true color or indices to the CLUT 234) can be stored in off-screen memory and used of overlay playback video from the on-screen memory. The playback video data is passed through the video backend pipeline 204 and the window of static graphics data is passed through the graphics backend pipeline 205.

Bit block transfer (BitBLT) circuitry 209 is provided to allow blocks of graphics data within frame buffer 107 to be transferred, such as when a window of graphics data is moved on the display screen by a mouse. Digital-to-analog converter (DAC) circuitry 210 provides the requisite analog signals for driving display 106 in response to the receipt of either video data from video back-end pipeline 204 or graphics data from back-end pipe line 208.

In implementing the operations discussed above, video front-end pipeline 200 can receive data from two mutually exclusive input paths. First, in the "playback mode," playback (non-real time) data may be received via the PCI bus through CPU interface 206. Second, in the "overlay emulation mode" either real-time or playback video may be received through the video port interface 211 (in system 100 video port interface 211 is coupled to bus 109 when real-time data is being received). The selection of video from the PCI bus or video from video port interface 211 is controlled by a multiplexer 212 under the control of bits stored in a video front-end pipeline control register within video control registers 203. In the playback mode, either CPU 101 or a PCI bus master controlling the PCI bus provides the frame buffer addresses allowing video front-end pipeline 200 to map data into the frame buffer separate and apart from the graphics data. In the overlay emulation mode, overlay input window controls 213 receives framing signals such as VSYNC and HSYNC, tracks these sync signals with counters to determine the start of each new frame and each new line, generates the required addresses for the real-time video to the frame buffer space using video window position data received from window controls 222 (as discussed above, in the preferred embodiment, video data is always retrieved from either the on-screen on off-screen memory and passed through video back-end pipeline 204 as a function of display position) and thus the position data from controls 222 is used to both write data to memory and retrieve data therefrom). In general, overlay input video control windows are controlled by the same registers which control the back-end video pipeline 204, although the requisite counters and comparators are located internal to overlay input video control circuitry 213.

Video front-end pipeline 200 also includes encoding circuitry 214 that is operable to truncate 16-bit YUV 422 data into an 8-bit format and then pack four such 8-bit encoded words into a single 32-bit word which is then written into the video frame buffer space of frame buffer 105. Scaler 215 is included for scaling data prior to encoding by encoding circuitry 214. For a more complete description of encoder 214 and the associated decoder 225 of video pipeline 204, reference is now made to incorporated copending coassigned application Ser. No. 08/223,845. The selection and control of the encoding circuitry 214 and scaler circuitry 215 is implemented through multiplexing circuitry 212, each of which are controlled by bits in the video control registers.

Memory control circuitry 201 includes an arbiter 218 and a memory interface 219. Arbiter 218 prioritizes and sequences requests for access to frame buffer 107 received from video front-end pipeline 200, graphics controller 208 and bit block transfer circuitry 209. Arbiter 218 further sequences each of these requests with the refresh of the display screen of display 106 under the control of CRT controller 202. Memory interface 219 controls the exchange of addresses, data, and control signals (such as RAS, CAS and read/write enable) to and from frame buffer 107.

CRT control/video window control circuitry 202 includes the CRT controller 220, window arbiter 221, and video display window controls 222. CRT controller 202 controls the refresh of the screen of display 106 and in particular the rastering of data from frame buffer 107 to display unit 106 through DAC 210. In the preferred embodiment, CRT controller 220, through arbiter 218 and memory interface 219, maintains a constant stream of graphics data into graphics backend pipeline 205 from memory; video or playback graphics data is rastered out only when a window has been reached by the display raster as determined by display position controls of window controls 222 (see FIGS. 3 and 5 and accompanying text) and CRT controller 220. As will be discussed in further detail below, the display of windows within the display according to the principles of the present invention is controlled in part by circuitry 202.

Video back-end pipeline 204 receives a window of graphics or video data defining a display window from the on-screen or off-screen spaces in frame buffer 107 through a pair of first-in/first-out memories **223*a* and 223*b*. In the preferred embodiment, each FIFO receives the data for every other display line of data being generated for display on the display screen. For example, for a pair of adjacent lines n−1 and n+1 in memory (although not necessarily adjacent on the display) for the display window, FIFO 223*a* receives the data defining window display line n−1 while FIFO 223*b* receives the data defining window display line n+1. As will be discussed further below, one or more display lines, which falls between line n−1 and line n+1, may be selectively generated by interpolation. Decoder circuitry 225 receives two 32-bit packed words (as encoded by encoder 214), one from each adjacent scan line in memory, from FIFOs 223*a* and 223*b*. Each 32-bit word, which represents four YCrCb pixels, is expanded and error diffused by decoder 225 into four 16-bit YCrCb pixels. In modes where video data is stored in the frame buffer in standard 555 RGB or 16 YCrCb data formats, decoder block 225** is bypassed.

Back-end video pipeline 204 further includes a Y interpolator 226 and X interpolator 227. In the preferred embodiment, during Y zooming (expansion) Y interpolator 226 accepts two vertically adjacent 16-bit RGB or YCrCb pixels from the decoder 225 and calculates one or more resampled output pixels using a four subpixel granularity. X interpolator 227 during X zooming (expansion) accepts horizontally adjacent pixels from the Y interpolator 226 and calculates one or more resampled output pixels using a four subpixel granularity. For data expansion using line replication, Y interpolator 226 is bypassed. Y interpolator 226 and X interpolator 227 allow for the resizing of a video display window being generated from one to four times.

The output of X interpolator 227 is passed to a color converter 228 which converts the YCrCb data into RGB data for delivery to output multiplexer 304. To reiterate, if graphics data is passed through video pipeline converter 228 is not used.

Back-end video circuitry 204 further includes pipeline control circuitry 229, overlay control circuitry 230 and output multiplexer 231. Pipeline control circuitry 229 controls the reading of data from video FIFOs **223*a* and 223*b*, controls the generation of interpolation coefficients for use by X and Y interpolators 226 and 227 to resize the video window being pipelined, and times the transfer of data through the pipeline. Overlay control circuitry 230 along with control circuitry 202, controls the output of data through output multiplexer 231, including the overlay of the video window over the graphics data output through the graphics back-end pipeline 205. A pixel doubler 237** is provided to double the number of pixels being generated such that a 1280×1024 display can be driven.

Graphics back-end pipeline 205 includes a first-in/first-out memory 232, attribute controller 233, and color look-up table 234. Each 32-bit word output from graphics FIFO 232 is serialized into either 8-bit, 16-bit or 24-bit words. The 8-bit words, typically composed of an ASCII code and an attribute code for text mode, are sent to attribute controller 233. Attribute controller 233 performs such tasks as blinking and underlining operations in text modes. The eight bits output from attribute controller 233 are pseudo-color pixels used to index CLUT 234. In graphics modes, 8 bits are sent directly to index the color look-up table, bypassing attribute controller 233. When 16-bit and 24-bit words, which are typically color data, are serialized, those words are sent directly to overlay controls 230 and multiplexer 231. CLUT 234 preferably outputs 24-bit words of pixel data to output multiplexer 231 with each index.

The eight bit pseudo-color pixels are output from attribute controller 233 are also sent to overlay controls 230. In the preferred embodiment, data is continuously pipelined from on-screen memory through graphics back-end pipeline 205 to the inputs of output multiplexer 231. Window data from off-screen memory however is only retrieved from memory and pipelined through video backend pipeline 204 when a window is being displayed. In other words, when a video window has been reached, as determined by control bits set by CPU 101 in VW control registers 222, video window display controls 222 generate addresses to retrieve the corresponding data from the off-screen memory space of frame buffer 107. Preferably, video FIFOs 223*a* and 223*b* are filled before the raster scan actually reaches the display window such that the initial pixel data is available immediately once the window has been reached. In order to insure that graphics memory data continues to be provided to graphics back-end pipeline 205, video window display controls 222 "steal" page cycles between page accesses to the graphics memory. It should be noted that once the window has been reached the frequency of cycles used to retrieve window data increases over the number used to fill the video FIFOs when outside a window. When the frequency of window page accesses increases, video window display controls 222/arbiter 221 preferably "steal" cycles from page cycles being used to write data into the frame buffer (i.e. output is given priority over input).

Figure 3:
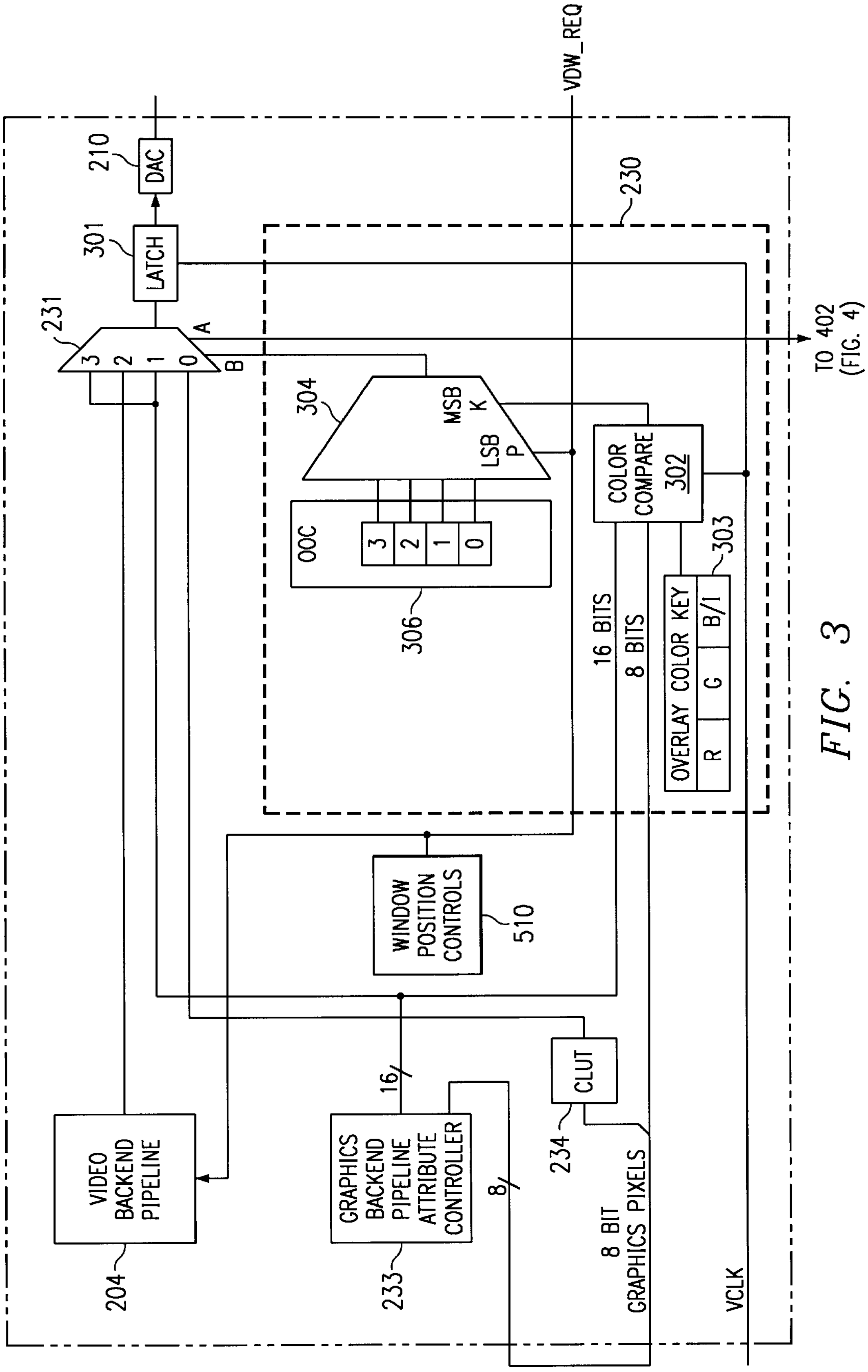
FIG. 3 is a more detailed functional block diagram of the circuitry of the back-end pipelines of FIG. 2 which control the selection (overlay) of video and graphics data for delivery to the display device of FIG. 1.

FIG. 3 is a more detailed functional block diagram emphasizing the circuitry controlling the overlay of data from graphics pipeline 205 with window data from video pipeline 204. As discussed briefly above, the inputs to output multiplexer 231 are data from video back-end pipeline 204 (pixel doubler 237), 16 or 24-bit color data directly from graphics back-end pipeline 205 serializer 236 or 24-bit color data from the color look-up table 234. The output of data to DAC 210 through output multiplexer 231 is controlled by a latch 301 clocked by the video clock (VCLK). The remaining circuitry shown in FIG. 3, which will be discussed in further detail below, provide the necessary control signals to the control inputs of output multiplexer 231 to select between the video and graphics pipelines.

The graphics pseudo-pixels output from attribute controller 233 and the 16-bit or 24-bit graphics or video data output directly from serializer 236 are provided to the inputs of color comparison circuitry 302. Also input to color comparison circuit 302 are 16 or 24-bit overlay color key bits stored in overlay color key register 303. Overlay color key register 303 resides within the address space of, and is loaded by, CPU 101. Color comparison circuitry 302 compares selected bits from the overlay color key register 303 with either the 8 bits indexing look-up table 234 in the color look-up table mode (pseudo-color mode) or the 16-bits (24-bits in the alternate embodiment) passed directly from serializer 236. It should be noted that in the illustrated embodiment, overlay color key register 303 holds 24-bits of overlay color key bits, eight each for red, green, and blue/index comparisons. The specific overlay color key bits compared with the input graphics data are provided in Table I:

| MODE | OVERLAY COLOR KEY BITS COMPARED | | |
|---|---|---|---|
| CLUT Index | — — | — — | Blue/Index <7:0> |
| 5:5:5 | Red<4:0> | Green<4:0> | Blue<4:0> |
| 5:6:5 | Red<4:0> | Green<5:0> | Blue<4:0> |
| 8:8:8 | Red<7:0> | Green<7:0> | Blue<7:0> |

Figure 4A:
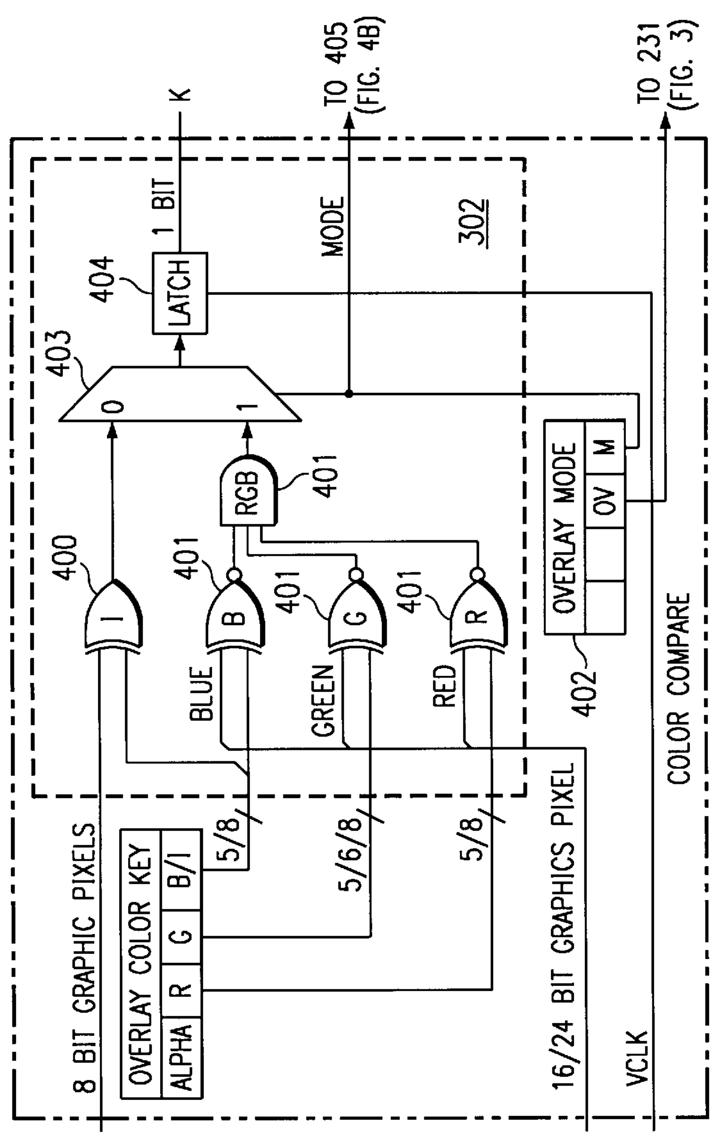
FIGS. 4A and 4B are gate level diagrams showing alternate embodiments of color comparison circuitry of FIG. 3.

As shown in FIG. 4A, a first embodiment of color comparison circuitry 302 performs the comparisons set forth in Table 1 as a set of XNOR operations in series with an AND operation. FIG. 4A depicts first comparison circuitry 400 for comparing the 8-bits of graphics pixels received in the look-up table mode from attribute controller 233 with the 8-bit blue/index overlay key bits being held in overlay key register 303. Second comparison circuitry 401, performs the required comparisons of Table 1 for the 16-bit data or 24-bit received from serializer 236, in, either a 5:5:5, 5:6:5, or 8:8:8 format. An overlay register 402 includes a bit m loaded by CPU 101 which is used by a selector 403, depending on the mode, to select for output, either the result of the comparisons being made by comparison circuitry 400 in the color look-up table mode or the results of the comparisons being made by comparison circuitry 401. In the illustrated embodiment, color comparison circuitry 302 processes data on a pixel-by-pixel basis and is resynchronized with both the graphics back-end pipeline 205 and the video back-end pipeline 204 by having its outputs latched to the video clock (VCLK) by latches 404.

Figure 5:
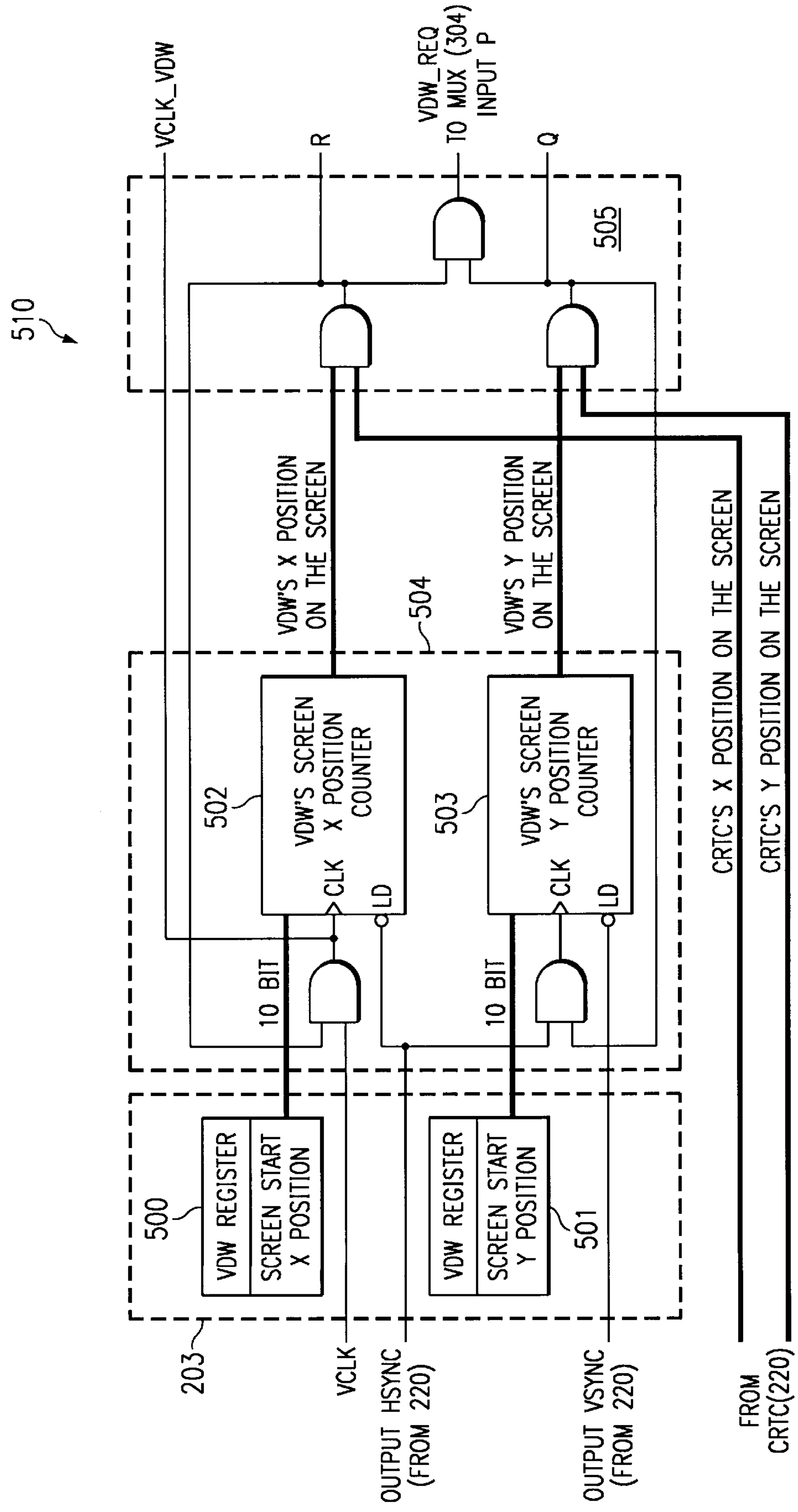
FIG. 5 is a gate level diagram of the video window position controls and pixel position compare circuitry of FIG. 3.

The output of color comparison circuitry 302 is passed to the "K" control input of overlay control multiplexer 304. The "P" control input to multiplexer 304 is provided from window position controls 510 (FIG. 5). The data inputs to multiplexer 304 are coupled to an 8-bit overlay OP Code (OOC) register 306. The output of multiplexer 304 is used as one control input to output multiplexer 304, which along with the OV set by CPU 101 into register 402 in the overlay mode, selects which of the data received at the data inputs of multiplexer 231 will be output to DAC 210.

Figure 4B:
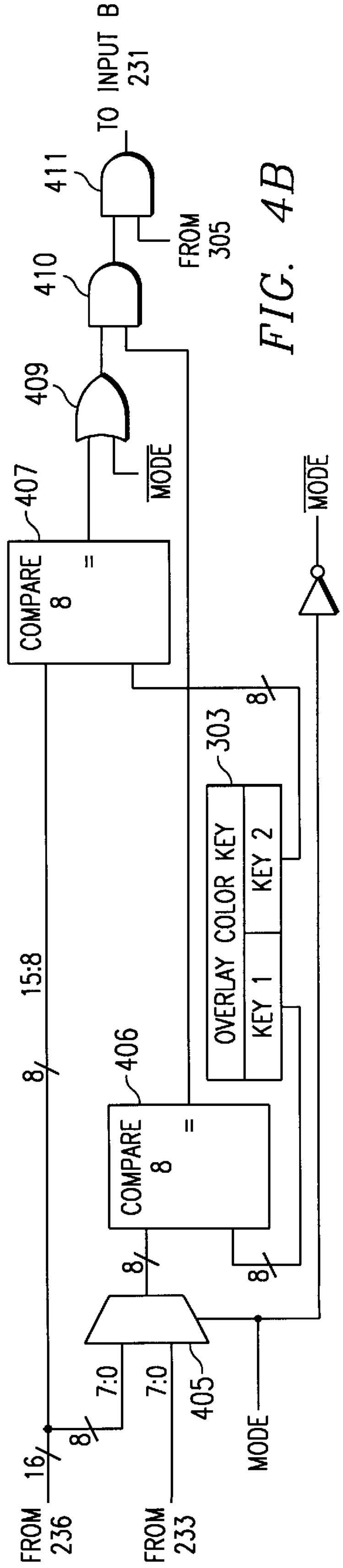

FIG. 4B is an alternate embodiment of the color comparison circuitry of FIG. 3. In a first mode, 8 bits are from attribute controller 233 are passed through multiplexer to comparator 406. Comparator 406 compares the received eight bits with an 8-bit color key in color key register 408; when the received 8-bits equal the 8-bit key 1, the output of comparator 406 goes active (high). In the first mode, control signal /MODE is high (and the output of NOR gate 409 is consequently high) and an active output from comparator 406 is gated through AND gate 410. The output of AND gate 410 is passed to AND gate 411 and gated with the output from the pixel comparison circuitry 305. The output of AND gate 411 goes directly to the "B" control input of selector 231 (in this embodiment multiplexer 304 and register 306 are eliminated). Thus, when the 8-bit graphics pixels output from attribute controller 233 of graphics backend 205 matches the 8-bit color key 1 and the window has been reached as determined by pixel comparison circuitry 304, the pixel data output from video backend 204 are passed through selector 231.

In a second mode, 16 bits are received from serializer 236. The right LSBs are passed through multiplexer 405 to comparator 406 and the eight MSBs passed to comparator 407. Control signal /MODE is high. When the LSBs equal key 1 in color register key 408 and the 8 MSBs equal key 2 in color key register 408, the outputs from comparators 406 and 407 are active (high). The output of AND gate 411 then goes high when the output from pixel comparison circuitry 305, which is coupled to the "B" control input of selector 231, goes high. Thus, when the 16-bit pixel data output from serializer 236 of graphics backend 205 matches the 16-bit color key (keys 1 and 2) and a window has been reached, the output pixel data from video backend 204 are passed through selector 231.

Figure 10:
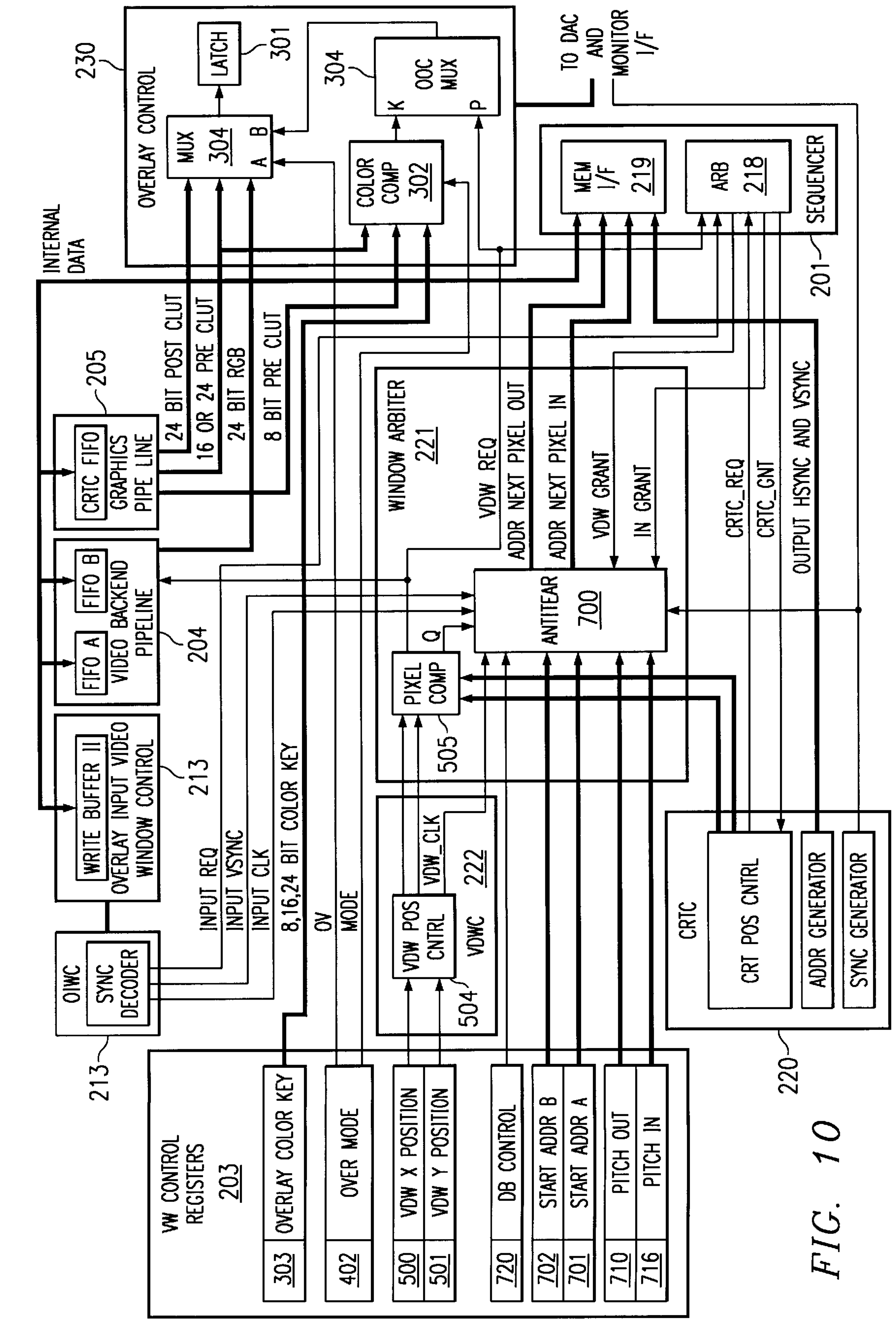
FIG. 10 is a functional block diagram emphasizing the preferred interconnection between the anti-tearing circuitry of FIG. 7 and the window controls and data pipelines of FIGS. 2 and 3.

The "P" input to multiplexer 304 is controlled by window position controls 510 and CRT position controls located within CRT controller 220 (see FIG. 10). The CRT position controls includes counters which, track the position of the current pixel being generated for display. In the preferred embodiment, the CRT controls includes at least an x-position counter which tracks the generation of each pixel along a given display line and a y-position counter which tracks the generation of each display line in a screen. The x-position counter may for example count pixels by counting each VCLK period between horizontal synchronization signals (HSYNC) controlling display line generation on display unit 106. The y-position counter may for example count each HSYNC signal occurring between each vertical synchronization signal (VSYNC) controlling the screen generation on display unit 106.

FIG. 5 is an expanded functional block diagram of the window position controls 510. Position controls 510 are coupled to a screen position x-register 500 and a screen position y-register 501, and include a screen x-position counter 502, and a screen y-position counter 503. In the preferred embodiment, registers 500 and 501 are located within window control registers 203 and counters 502 and 503 (collectively designated 504) are located with video window controls 222.

Registers 500 and 501 are loaded with a value representing the x and y screen position of the pixel in the upper left corner of the video window (the starting pixel). Screen x-register 500 and screen y-register 501 in the preferred embodiment are loaded by CPU 101. The screen x-position counter 502 counts down from the value held in screen x-register 500 with each video clock when R (the output of circuitry 305) is high (output) for each display line and reloads with each display horizontal synchronization signal (HSYNC) (note that when P is high the CRT count matches the position count). Screen y-position counter 503 counts down from the value set into screen y-register 501 for each horizontal sync signal (HSYNC) when control (timing) Q is high for each display frame at the start of each display line and reloads with each output (display) VSYNC at the start of each new screen (The position counters are allowed to count only when they match their respective CRT counters). The counts values in the counters of CRT position controls 220 are compared pixel by pixel with the counts in screen x-position counter 502 and screen y-position 503 by comparison pixel position circuitry 505. When both the x and y counts in the counters of CRT position controls match the corresponding x and y counts in respective counters 502 and 503, the select signal (VDW_Reg) to multiplexer input P 304 is activated. The activation of select signal (VDW_Reg) indicates that the raster scan on display 106 has reached the position of a pixel within the window and data from video pipeline 205 may be painted depending on the value being held in overlay OP Code (OOC) register 306 and the K control inputs to multiplexer 304.

A 4-bit OP Code loaded by CPU 101 into overlay OP Code register 306 in conjunction with the control signals applied to the "P" and "K" control inputs to multiplexer 304 control the presentation of an active (assumed high in the illustrated embodiment) control signal to the "B" control input to output multiplexer 231. The other ("A") input to output multiplexer 231 receives a bit from overlay mode register 402 (FIG. 4), as loaded by CPU 101. In the illustrated embodiment, the selection between the streams from the graphics and video backends at the 0,1,2 inputs to output multiplexer 304 in response to the signals presented at the corresponding control inputs "A" and "B" is in accordance with Table II:

| Control Input A | Control Input B | Selected Stream |
|---|---|---|
| 0 | 0 | Graphics pixels from CLUT 234 at input 1 |
| 1 | 0 | Graphics pixels from serializer 236 |
| 0 | 1 | Video or CLUT 234 |
| 1 | 1 | Video or serializer 236 |

The OP Codes used in the illustrated embodiment, the effective overlay and the corresponding inputs to the control inputs of multiplexer 304 are listed in Table III (active state is assumed):

| Overlay OP Code Register 309 Value | Multiplexer 307 Control Inputs | Effect |
|---|---|---|
| 0 | N/A | Pixels passed only from graphics pipeline 205 |
| A | Input R active, Input K inactive | Paint pixels from video backend pipeline 204 only inside video window VDW |
| 8 | Inputs K and P active | Paint from video backend pipeline 204 window VDW when color key matches |
| C | Input K active, Input P inactive | Paint from video backend pipeline 204 if color key matches |

In the illustrated embodiment, if a Oh is written into OOC register 306 by CPU 101, only pixels from graphics pipeline 205 are pipelined through multiplexer 304. In this case any signals applied to the P and K control inputs to multiplexer 304 have no effect (i.e., will not result in a high output from multiplexer 304). In the illustrated embodiment, if an Ah is written into OOC register 306 and the A input to MUX 231 is active, pixels from video pipeline 204 will be passed to DAC 210 only when pixel position comparison circuitry 505 determines that the raster scan has reached a pixel in the window and hence the control signal going to the P input of multiplexer 304 has been activated. If on the other hand, an 8h is written into OOC register 306 and the A input to MUX 231 is active, data is passed through output multiplexer 231 to DAC 210 when pixel position comparison circuitry 505 determines that the raster scan has reached a pixel on the display screen within the window and color compare circuitry 302 has determined that the incoming data from graphics pipeline 205 matches the overlay color key held in overlay color key register 302. In this case, the data from video pipeline 204 is passed to DAC 210 when both the P and the K inputs to multiplexer 304 are active. Finally, when an OpCode of C is programmed into OOC register 306 and the A input to MUX 231 is active, data from video pipeline 204 is passed if the incoming data from graphics pipeline 205 matches the overlay color key held in overlay color key register 302. In this case, the activation of the K control input activates the output of multiplexer 304 to switch the input of multiplexer 231 to pass the corresponding video pixels.

Figure 6:
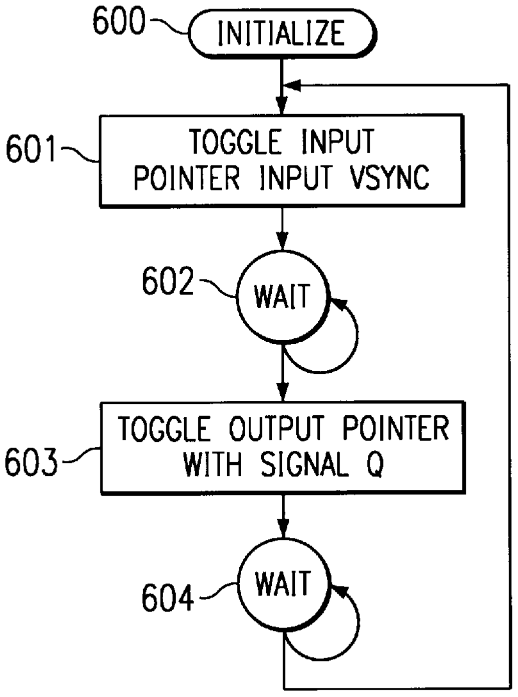
FIG. 6 is a flow chart describing a method of controlling tearing in a graphics/video display system, such as system 100, according to the principles of the present invention.

FIG. 6 is a flow diagram depicting a preferred method of controlling tearing in a display control system, such as system 100. Generally, this method controls display tearing by controlling frame buffer access when data is input to the frame buffer at a rate which is lower, or even much lower, than the rate at which data is retrieved from the frame buffer for display refresh (update). Preferred circuitry for implementing this method will be discussed later in conjunction with FIGS. 7–9.

Figure 9:
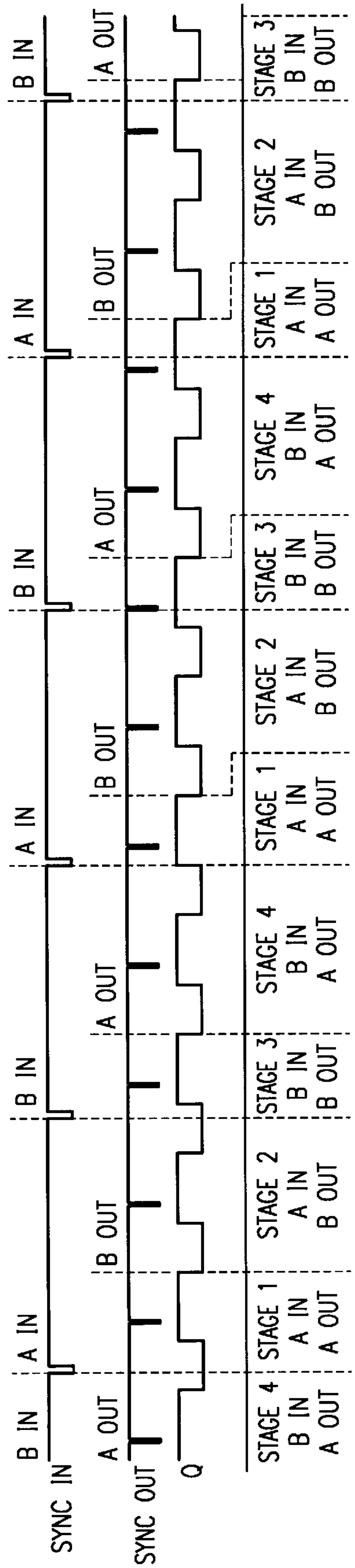
FIG. 9 is a timing diagram illustrating the preferred operation of the circuitry shown in FIGS. 7 and 8.

According to the principles of the present invention, the off-screen frame buffer space is divided into at least two buffer areas, designated Buffer A and Buffer B. The input data stream, such as an asynchronous video data stream received through Vport 211, is associated with a pointer to the memory areas (buffers) and a input vertical synchronization signal (Input Vsync) which indicates the start of each new frame of data being input. The output data stream is associated with a pointer to the buffers and an output vertical synchronization signal (Output Vsync) which indicates the start of each new frame of data being output from the frame buffer for display generation. For purposes of illustration, assume that the input Vsync rate is less than the output Vsync rate as shown in FIG. 9; in alternate embodiments the relationship will change as either the input frame rate, output frame rate, or both are varied.

At step 600, the system is initialized, such that the input pointer is directed to Buffer B and the output pointer is directed to Buffer A. Then, the procedure starts at step 601 when the input pointer to frame buffer 107 toggles with the leading edge of the next active cycle of the input VSYNC signal received at the VPORT. If the input pointer is currently pointing to buffer B before the arrival of the input VSYNC signal, it points to buffer A after toggling, and vice versa. With the first input VSYNC after initialization the output and input pointers will now be directed to Buffer A in the present example. The output pointer continues to point to whichever buffer it was pointing to before the input VSYNC signal arrived.

At step 602, a wait loop is entered in anticipation of the arrival of the next active cycle of the control signal Q (FIG. 5) which indicates that a display line has been reached which includes video data. At step 603, the output pointer toggles with the leading edge of the control (timing) signal Q after the toggling of the input Vsync, as described at Step 601. At step 604, a second wait loop is entered in anticipation for the next input VSYNC signal to arrive, at which time the procedure returns to step 601.

Figure 7:
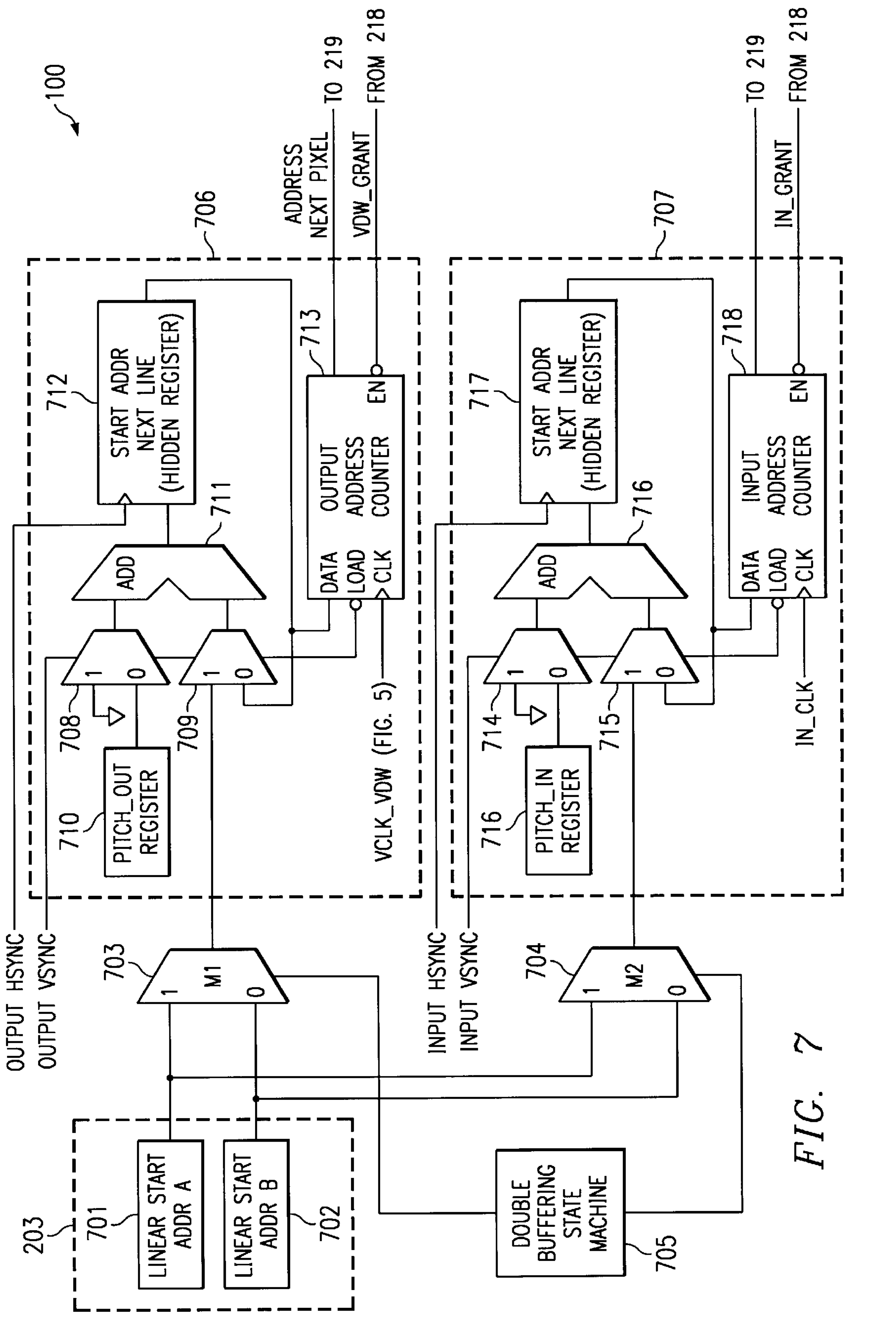
FIG. 7 is a more detailed functional block diagram of preferred circuitry for implementing the method of FIG. 6.

FIG. 7 is a functional block diagram of anti-tear control circuitry 700 embodying the principles of the present invention. Anti-tear circuitry 700 includes a pair of linear start address registers 701 and 702, each programmable to the starting address or corresponding pair of buffers A and B within frame buffer 107. Preferably, linear start address register 701 and 702 are provided as part of video window control registers 203 and are loadable through CPU interface 206.

The linear start addresses stored in registers 701 and 702 are provided to corresponding input of a pair of multiplexers 703 and 704. Multiplexers 703 and 704 each point input and output address to the buffers A and B. Multiplexers 703 and 704 in turn are controlled by a double buffering state machine 705, which will be discussed in detail in conjunction with FIG. 8. The output of multiplexer 703 is coupled to output control circuitry 706. In general, output control circuitry 706 controls the addressing of frame buffer 107 to retrieve data from buffers A and B, as appropriate to generate a display. Similarly, the output of multiplexer 704 is provided to input control circuitry 707. In general, input control circuitry 707 controls the input of data received at the VPORT for buffers A and B.

Output control circuitry 706 includes a pair of multiplexers 708 and 709 which are switched by the output video synchronization signal (output VSYNC) which times the start of each new display frame on the screen of display unit 106. Multiplexer 708 switches when VSYNC is high to a zero value (zeros volts or ground) and to a value held in a pitch register 710 (pitch_out) when VSYNC is low. The pitch value in pitch_out register 710 is the difference in addresses between the linear addresses to display Pixel (X,Y) and display Pixel (X,Y+1), or two adjacent pixels on different display lines. Multiplexer 709 switches to receive a linear start address passed by multiplexer 703 when the output VSYNC is high and to the feedback value from register 712 when the output VSYNC is high.

The outputs of multiplexers 708 and 709 are then provided to the input of an adder 711. The output of adder 711, is in turn provided to a register or latch 712. Preferably, the register (latch) is a hidden register which cannot be accessed by software. The initial value which is switched to register 711 with the active cycle of the output VSYNC signal is zero plus the linear start address which is equal to the address of the first pixel of the first line. Subsequently, when output VSYNC goes inactive (low), the output of adder 711 is equal to the pitch (i.e., the difference in value between the addresses to the first pixels of adjacent display lines) plus the current value in register 712. The new value from adder 711 is clocked into register 712 as the address to the first pixel in the next line with the output horizontal synchronization signal (output HSYNC) which times the start of each new display line.

The output from register 712 is passed to the output address counter 713. The output address counter is clocked by VCLK_VDW which times the generation of video pixels in the x display direction when in x boundaries of the video window. The output of output address counter 713 is enabled by VDW_GRANT which is provided from arbiter 218; when arbiter 218 determines that an access to frame buffer 107 for retrieval of data for display generation is allowable, the output of counter 713 is enabled and provides the memory address from where the next pixel to be displayed is fetched from.

Input circuitry 707 is similar to output control circuitry 706, except that input control circuitry controls the addressing for input of data into buffers A and B and is timed from the input vertical and horizontal synchronization signals received through the VPORT. Input control circuitry 707 includes a pair of multiplexers 714 and 715. Multiplexer 714 switches between a zero value (i.e., zero volts or ground)

and a value set in pitch_in register 716. As discussed above, the pitch register holds a value which represents the difference between addresses for corresponding pixels in adjacent rows. Multiplexer 715 switches between the linear start address selected by multiplexer 704 and a feedback value from register 717. Both multiplexer 714 and 715 are switched by an input VSYNC signal received through the VPORT. When the input VSYNC is active (high), multiplexer 714 passes the zero value and multiplexer 715 passes the linear start address 704. The two values and then added together by an adder circuit 716. The resulting value, which represents the start address for the memory display line being input is stored in a register 717.

When the input VSYNC goes inactive (low), multiplexers 714 and 715 switch to pass to adder 719 the value in pitch register and the current value in start address register 719. The resulting value which is clocked into register 719 with the input HSYNC signal, represents the address to the first pixel of the next display line being received at the VPORT.

Each value in register 717 is also passed with the input HSYNC to an input address counter 718. Address register 618 is clocked by the input clock IN_CLK received through overlay input video window controls 213 through the VPORT. Input address counter 718 is enabled by arbiter 218 when an input access is allowable through the control signal IN_GRANT. The output from input address counter 718 is the address to the selected buffer A or B for the input of data.

Figure 8:
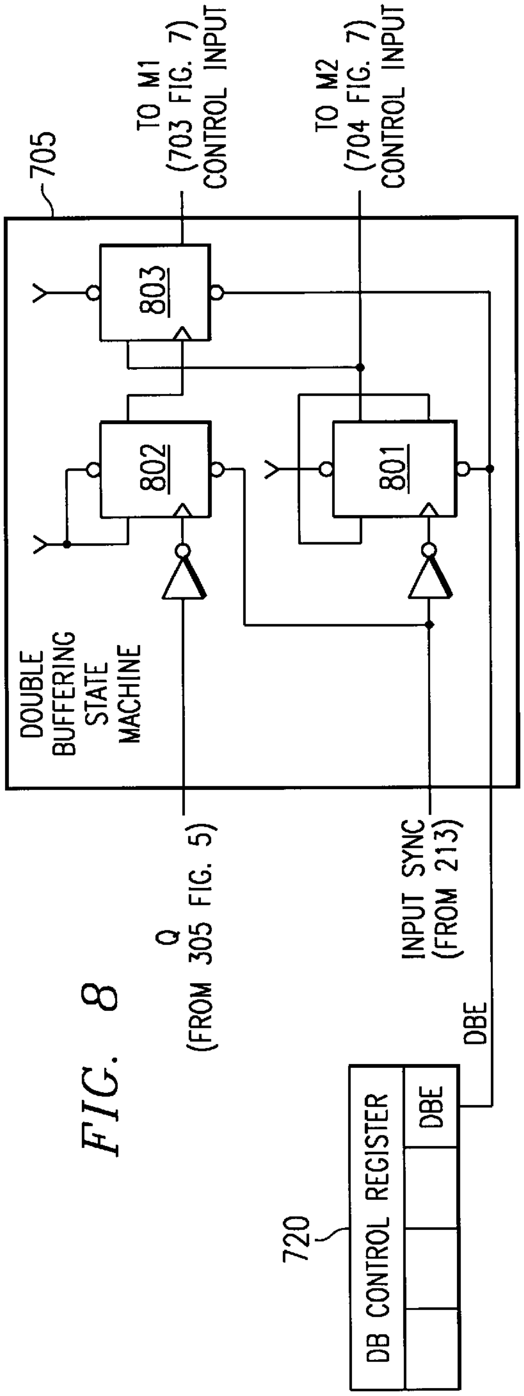
FIG. 8 is a gate level diagram of a preferred embodiment of the double buffering state machine shown in FIG. 7.

FIG. 8 is a functional block diagram of double buffering state machine 705. In the preferred embodiment, double buffering state machine 705 is constructed of the plurality of D-type flip-flops 801–803, coupled as shown in FIG. 8, although in alternate embodiments, double buffering state machine 705 may be implemented in any one of a number of possible other circuits. The inputs to state machine 705 include the input vertical synchronization signal from input control 213 and the Q signal from circuitry 505 (see FIG. 5). A double buffering enable signal (dBE) enables and disables the double buffering feature of the present invention as required. DBE is preferably controlled by a bit setting in DB control register 720.

FIG. 9 further illustrates the operation of anti-tearing circuitry 700. When the double buffer enable signal (DBE) is low, the input address is pointing to buffer A and the output address is pointing to buffer A. In the preferred embodiment, when double buffer enable (DBE) goes high (active), double buffering state machine 705 goes into a four-stage operating mode.

During stage 1, output addresses from counter 713 are providing output accesses to buffer A. At the same time, addresses out of input address counter 718 are allowing input accesses also to buffer A. In other words, input data is streaming into buffer A and output data is streaming out of buffer A. Stage 1 begins with an input VSYNC signal and ends with the first trailing edge of a Q signal after this input VSYNC which indicates that the display device is rastering out a display line that contains part of the video window.

Stage 2 begins with this same trailing edge of Q and ends with the next input VSYNC. During this stage, input addresses are still directed to buffer A. Output addresses are providing accesses to buffer B. Input data is streaming into buffer A and output data is streaming out of buffer B.

The next stage is stage 3, in which input addresses are directed to buffer B and output addresses are also directed to buffer B. Input data is streaming into buffer B and output data is streaming out of buffer B. Stage 3 begins with an input VSYNC and ends with the first trailing edge of signal Q after this input VSYNC.

In stage 4, input data is sent to addressed locations in buffer B and output data is retrieved from addressed locations in buffer A. Stage 4 begins with the same trailing edge of signal Q that ended stage 3 and ends with an input VSYNC, which initiates stage 1 of the next cycle. Note that Q can charge more than once before the input VSYNC goes active. This is irrelevant to when stage 2 or stage 4 ends. The stage ends only on the active going edge of the input VSYNC.

It should be noted that every buffer toggle is a two-step operation. The slower input VSYNC starts the first step (stages 1 and 3) and the faster timing signal Q starts the second step (stages 2 and 4). The output rastering pointer will never overrun the input rastering pointer, because of where each raster pointer is reloaded. The only time (stages 1 and 3) both streams are rastered to and from the same buffer, the output (faster) stream is ahead of the input (slower) stream.

Since the output stream is faster than the input stream, there will be times in stage 1 and stage 3 when Q is active more than once. In these instances, the same Buffer is output repeatedly for each active Q in that stage. In other words, stages 2 and 4 are very short stages; their duration is between the active going edge of the input VSYNC and the very first active going edge of Q after that input VSYNC goes active. Whereas stages 1 and 3 could be very long stages, because the Q signal could change stages a number of times before the next input VSYNC active edge occurs.

FIG. 10 is a functional block diagram emphasizing a preferred interconnection of the circuitry described above.

Although the present invention and its advantages have been described in detail, it should be understood that various changes, substitutions and alterations can be made herein without departing from the spirit and scope of the invention as defined by the appended claims.

What is claimed is:

1. A method of controlling tearing in a display control system including first and second buffers, input of data to a selected one of the buffers controlled by an input pointer and output of data from a selected one of the buffers controlled by an output pointer, the method comprising the steps of:

inputting data into the first buffer and substantially simultaneously outputting data from the first buffer;

toggling the output pointer;

inputting data into the first buffer and outputting data from the second buffer;

toggling the input pointer;

inputting data into the second buffer and outputting data from the second buffer;

toggling the output pointer; and outputting data from the first buffer and inputting data into the second buffer.

2. The method of claim 1 and further comprising an initialization step comprising the substeps of setting the input and output pointers such that data is output from the first buffer and data is input to the second buffer.

3. The method of claim 2 wherein said step of initialization includes the step of toggling the input pointer such that data is input to the second buffer.

4. The method of claim 1 wherein said step of toggling the input pointer comprises a step of toggling the input pointer in response to an input timing signal controlling the timing of transfer of display data from an input source.

5. The method of claim 4 wherein said input timing signal is generated by the input source.

6. The method of claim 4 wherein said input timing signal comprises an input vertical synchronization signal.

7. The method of claim 1 wherein said steps of toggling the output pointer comprise the substep of toggling the output pointer with an output timing signal controlling the transfer of display data to a display device.

8. The method of claim 7 wherein the output timing signal transitions active during a period beginning immediately prior to output to an associated display device of a first line of display data which includes video data retrieved from video memory.

9. The method of claim 1 wherein the first and second buffers comprises areas of a frame buffer memory.

10. A method of controlling tearing in a display system including an input source and an output appliance, data received from the input source timed by an input timing signal and output of data to the output appliance timed by an output timing signal, the method comprising the steps of:

during a first stage, outputting data from a first area of a frame buffer and inputting data into the first area, the first stage starting with a first active cycle of the input timing signal and ending with an first active cycle of the output timing signal;

during a second stage, outputting data from a second area of the frame buffer and inputting data into the first area, the second stage starting with the first active cycle of output timing signal and ending with a second active cycle of the input timing signal;

during a third stage, outputting data from the second area and inputting data into the second area, the third stage starting with the second active cycle of the input timing signal and ending with a second active cycle of the output timing signal; and during a fourth stage, outputting data from the first area and inputting data into the second area, the fourth stage starting with the second active cycle of the output timing signal and ending with a third active cycle of the input timing signal.

11. The method of claim 10 wherein the data comprises video data.

12. The method of claim 11 wherein the input source comprises an asynchronously running video data source.

13. The method of claim 10 wherein the output appliance comprises a CRT display device.

14. The method of claim 10 wherein the output device displays images as a predetermined number of display pixels, each of the display pixels defined by a word of pixel data, and wherein a selected one of the first and second areas stores a number of words of pixel data less than a number of words of pixel data required to define said predetermined number of display pixels.

15. The method of claim 10 wherein said input timing signal comprises a vertical synchronization signal.

16. The method of claim 10 wherein said output timing signal transitions active during a period beginning immediately prior to output to an associated display device of a first line of display data which includes video data retrieved from video memory.

17. A display control system comprising:

a frame buffer memory having first and second areas for storing display data;

output addressing circuitry for generating addresses for retrieving data from a selected one of the buffer areas and operable to:

during a first operating stage, address said first buffer;

during a second operating stage, address said second buffer;

during a third operating stage, address said second buffer; and during a fourth operating stage, address said first buffer; and input addressing circuitry for generating addresses for inputting data into a selected one of the buffer areas and operable to:

during said first stage, address said first buffer;

during said second stage, address said first buffer;

during said third stage, address said second buffer; and during said fourth stage address said second buffer.

18. The display control system of claim 17 wherein:

said first stage is initiated with a first active cycle of an input timing signal and is ended with a first active cycle of an output timing signal;

said second stage is initiated with said first active cycle said output timing signal and is ending with a second active cycle of an input timing signal;

said third stage is initiated with said second active cycle of said input timing signal and is ending with a second active cycle of said output timing signal; and said fourth stage is initiated with said second active cycle of said output timing signal and is ended with a third active cycle of said input timing signal.

19. The system of claim 18 wherein said input timing signal is generated by an external source generating display data for input into said frame buffer.

20. The system of claim 18 wherein said input timing signal comprises an input vertical synchronization signal timing the input of frames of display data from an external source.

21. The system of claim 18 wherein said display data comprises video data.

22. The system of claim 18 wherein said output timing signal transitions to an active logic state during a period beginning immediately prior to output to an associated display device of a first line of pixel data which includes video data.

23. The system of claim 18 wherein said input and output addressing circuitry comprise a portion of a display controller integrated circuit.

24. Tearing control circuitry comprising:

first and second buffers;

means for generating input and output pointers for inputting data into said first buffer and substantially simultaneously outputting data from said first buffer;

means for toggling the output pointer for inputting data into said first buffer and outputting data from said second buffer;

means for toggling the input pointer for inputting data into said second buffer and outputting data from said second buffer; and means for toggling said output pointer for outputting data from the first buffer and inputting data into the second buffer.

25. The tearing control circuitry of claim 24 wherein said first and second buffers comprise areas of a frame buffer memory.

26. The tearing control circuitry of claim 24 wherein said means for toggling said input pointer toggles said input pointer in response to an active cycle of an input synchronization signal.

27. The tearing control circuitry of claim 24 wherein said means for toggling said output pointer toggles said output pointer in response to a timing signal.

* * * * *